(12) United States Patent
Oisugi et al.

(10) Patent No.: US 6,339,336 B1
(45) Date of Patent: Jan. 15, 2002

(54) MOVING MAGNET TYPE GALVANOMETER

(75) Inventors: Yutaka Oisugi, Funabashi; Takashi Oguro, Narashino, both of (JP)

(73) Assignee: Chiba Seimitsu Co., Ltd., Chiba (JP)

( * ) Notice: Subject to any disclaimer, the term of this patent is extended or adjusted under 35 U.S.C. 154(b) by 0 days.

(21) Appl. No.: 09/531,325

(22) Filed: Mar. 20, 2000

(30) Foreign Application Priority Data

Dec. 28, 1999 (JP) .......................................... 11-372374

(51) Int. Cl.[7] .............................................. G01R 27/26
(52) U.S. Cl. .................. 324/658; 324/686; 340/870.37; 340/870.25
(58) Field of Search .................. 324/658, 686, 324/143, 144, 145, 146; 340/870.37, 870.25

(56) References Cited

U.S. PATENT DOCUMENTS

| | | | | |
|---|---|---|---|---|
| 3,517,282 A | * | 6/1970 | Miller | 361/279 |
| 3,668,672 A | * | 6/1972 | Parnell | 324/660 |
| 3,732,553 A | * | 5/1973 | Hardway, Jr. | 340/870.37 |
| 4,588,997 A | * | 5/1986 | Tuan et al. | 347/210 |
| 4,864,295 A | * | 9/1989 | Rohr | 340/870.37 |
| 5,105,246 A | * | 4/1992 | Da Costa | 257/347 |
| 5,225,770 A | * | 7/1993 | Montagu | 324/146 |
| 5,537,109 A | | 7/1996 | Dowd | 340/870.37 |
| 5,844,673 A | * | 12/1998 | Ivers | 356/138 |

FOREIGN PATENT DOCUMENTS

| JP | 11304411 | 11/1999 |
|---|---|---|

* cited by examiner

*Primary Examiner*—Safet Metjahic
*Assistant Examiner*—Wasseem H. Hamdan
(74) *Attorney, Agent, or Firm*—Venable; Gabor J. Kelemen; Allen Wood

(57) ABSTRACT

A galvanometer is described which has increased capacitance and which is hardly affected by humidity while maintaining the advantages of low machining precision and being unaffected by temperature variations.

A front bearing and a rear bearing are fixed to a front shaft and a rear shaft, respectively, of a rotor held in a coil of a stator. Only an outer race of the front bearing is slidably inserted without being fixed to a case and has a force applied in a rear shaft direction by springs. A butterfly-shaped common electrode, which is patterned with a conductive thin film, is mounted on the rear shaft through a hub, and a four-division electrode is opposed thereto with an extremely small air gap to the butterfly-shaped common electrode. The four-division electrode is mounted on a spacer, and the spacer is mounted on the case so as to provide the air gap of a desired dimension. The rear shaft, the hub, and the spacer are made of an identical material.

7 Claims, 4 Drawing Sheets

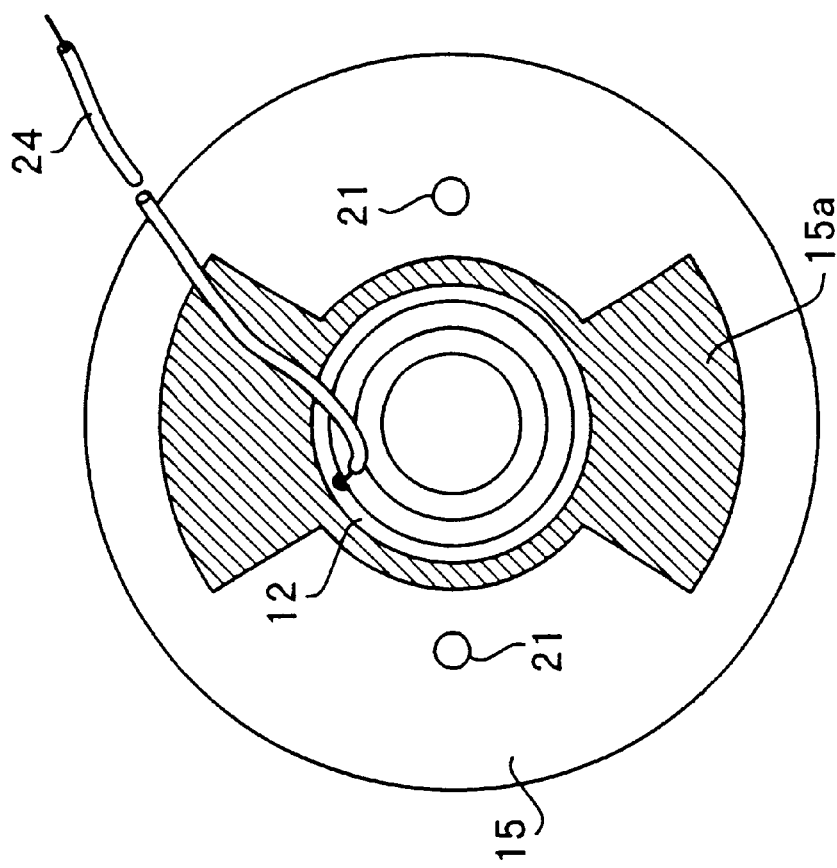
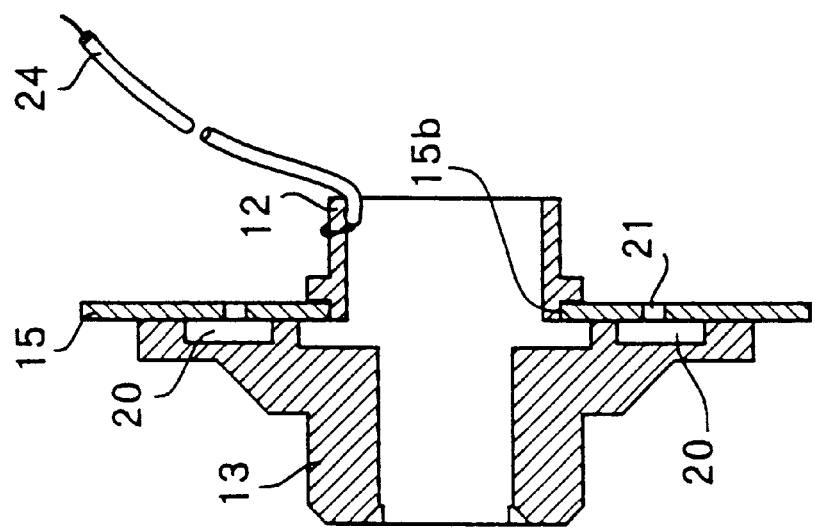

MOVING MAGNET TYPE GALVANOMETER

BACKGROUND OF THE INVENTION

1. Field of the Invention

The present invention relates to a galvanometer for a laser scanner used for laser marking, drilling of fine holes or the like.

2. Description of the Related Art

Various conventional proposals have been made for a capacitive position detector of a galvanometer, as in, for example, U.S. Pat. No. 5,537,109.

FIG. 5A and FIG. 5B are a perspective view and a side view, respectively, explaining a configuration of an electrode section of the conventional art mentioned above.

Butterfly-shaped intervening member 31 with a thickness t, made of a dielectric material having a high dielectric constant or permitivity such as a ceramic, is inserted in an air gap d between a fixed common electrode 30 and a fixed four-division electrode 32. This dielectric having a high dielectric constant intervening member 31 is fixed to a rotatable shaft 33, and air gaps $\delta_1$ and $\delta_2$ are provided between the intervening member 31 and each of the common electrode 30 and the four-division electrode 32, respectively. As the shaft 33 rotates, the change in capacitance between both the electrodes 30 and 32 due to the rotation of intervening member 31 is detected.

Generally, capacitive position detectors of this configuration have a 1.0 mm thick ceramic with a relative dielectric constant of about 6 to 7 as the dielectric having a high dielectric constant intervening member 31, and are designed to have air gaps $\delta_1$ and $\delta_2$ of about 0.1 mm. These detectors have an advantage in that high precision is not required for the parallelism between the electrodes 30 and 32, between the intervening member 31 and each of the electrodes 30 and 32, and for each of the air gaps $\delta_1$, and $\delta_2$, and d, since the air gap d between the electrodes 30 and 32 is large. Another advantage is that the change in detected capacitance due to dimensional changes in an air gap d because of temperature variations is small since the air gap d between the electrodes 30 and 32 is large.

However, even if a dielectric material having a high dielectric constant is used for butterfly-shaped intervening member 31, the capacitance is extremely small at about 2 to 3 pF since the air gap d between the electrodes 30 and 32 is wide, so that a high-frequency of about 500 kHz and a high-voltage of about 500 V signal needs to be applied to a circuit configuration for detecting the change in capacitance accompanied by a change in position. Therefore, extra measures are necessary to overcome noise and in view of the withstand voltage.

Moreover, for the dielectric having a high dielectric constant intervening member 31, ceramic is suitable and is used in practise. However, ceramic is porous and moisture penetrates into the pores under high humidity, so that it has the characteristic of decreased dielectric constant and has a drawback in that errors in detecting the capacitance are caused by the humidity.

The configuration of the conventional capacitive position detector thus has advantages in that machining precision is not required and changes in temperature hardly affect the conventional position detector. However, the conventional position detector also has a drawback in that it has smaller capacitance and it is likely to be affected by humidity.

SUMMARY OF THE INVENTION

Accordingly, it is an object of the present invention to provide a moving magnet type galvanometer which has increased capacitance while making use of the above-described advantages, and which is hardly influenced by humidity.

In order to achieve the above object, a moving magnet type galvanometer according to the present invention includes a case; a stator having a ferromagnetic outer yoke held in the case and a coil fixed inside the outer yoke; a rotor having a cylindrical permanent magnet and a front shaft and a rear shaft supporting the permanent magnet; a butterfly-shaped common electrode prepared by patterning a conductive thin film on a surface of a glass disc, the butterfly-shaped common electrode having a flat portion; a hub having a flat disc portion and a hub portion, mounted on a rear end of the shaft through a hole provided in the center of the hub portion and holding the butterfly-shaped common electrode with the flat portion perpendicular to the shaft; a spacer; and a four-division electrode mounted on the spacer so as to oppose the common electrode with an extremely small air gap therebetween. The spacer is mounted on the case so as to provide the air gap in a predetermined dimension.

In this aspect of the present invention, the hub may have a groove for adhesive collection on the surface of the disk portion and the glass disc of the common electrode may have holes for adhesive injection in a section having no conductive thin film; wherein the holes for adhesive injection are injected with an adhesive so as to fix the common electrode to the disc portion of the hub.

Moreover, in the aspect of the present invention, the common electrode may have a conductive thin film pattern formed by etching, after a conductive thin film is deposited or sputtered on the glass disc having a through-hole at its center. The through-hole is fixed, by soldering or conductive adhesive, with a lead pull-out terminal to be connected to the pattern.

In order to achieve the above object, another moving magnet type galvanometer according to the present invention includes a case; a stator having a ferromagnetic outer yoke held in the case and a coil fixed inside the outer yoke; a rotor having a cylindrical permanent magnet and a front shaft and a rear shaft supporting the permanent magnet; an inner race and an outer race of a rear bearing, into which the rotor inside the coil is inserted which supports the rear shaft, the races being fixed to a periphery of the rear shaft and the case, respectively, and an inner race of a front bearing supporting the front shaft, the inner race being fixed to a periphery of the front shaft, and an outer race of the front bearing, the outer race being movable in an axial direction by applying force in the rear shaft direction with springs; a butterfly-shaped common electrode prepared by patterning a conductive thin film on a surface of a glass disc, the butterfly-shaped common electrode having a flat portion; a hub having a flat disc portion and a hub portion, mounted on an end of the rear shaft through a hole provided in the center of the hub portion and holding the butterfly-shaped common electrode with the flat portion perpendicular to the shaft; and a four-division electrode mounted on a spacer so as to oppose the common electrode with an extremely small air gap therebetween. The spacer is mounted on the case so as to provide the air gap of a predetermined dimension. The rear shaft, the hub, and the spacer are made of identical material.

In this aspect of the present invention, the hub, the rear shaft and the spacer may be made of steel or a stainless steel material.

In this aspect, the capacitance increases and humidity hardly has an impact on the galvanometer, in addition to the advantages in that machining precision is not required and that the device is hardly influenced by temperature variations.

The present invention, unlike the conventional art, does not have a configuration for detecting the change in capacitance between both electrodes caused by an angle of a dielectric having a high dielectric constant butterfly-shaped intervening member which is fixed to a shaft in an air gap d between a common electrode and a four-division electrode.

The present invention is configured to detect the capacitance between a common electrode and a four-division electrode by fixing a conductive thin film patterned in a butterfly shape on a surface of a glass disc as the common electrode to a hub fixed to a shaft, and by opposing the four-division electrode thereto so as to maintain parallelism with the common electrode and to maintain an extremely close air gap δ(0.04 to 0.05 mm) therebetween.

Accordingly, the capacitance may be increased significantly to about 10 pF, so that a signal of around 70 kHz and 30 V can be applied to a circuit configuration, which is extremely advantageous against noise and in view of the withstand voltage.

Also, ceramic or the like providing adverse humidity effects is not used in the preferred embodiment of our invention.

However, since the air gap δ is small at 0.04 to 0.05 mm,, the capacitance is likely to be erroneously detected by the change in the air gap δ due to thermal expansion as described below. Moreover, the air gap δ has to be kept at 0.04 to 0.05 mm with high precision.

A differential rotation capacity-type angle converter proposed by the present applicant (Japanese Unexamined Patent Publication No. 11-304411) configures a circuit which cancels the change in δ due to thermal expansion by an electric circuit technique, and this proposal is significantly effective in preventing the impact of temperature variations. However, the present invention is designed to minimize the temperature variation in the air gap δ itself.

An outer race of a front bearing is pressed by springs with an appropriate pressure so as to be slidable in an axial direction, and an outer race and in inner race of a rear bearing are fixed to a case and a rear shaft, respectively, by pressing or attaching. The difference in axial dimensional changes between the case and the shaft due to temperature variations is roughly 0.02 mm at 20° under the design conditions but is corrected by a 0.02 mm spring displacement, thus providing neither thermal expansion effects nor stress at the rear shaft side.

When the present invention is configured as mentioned above and the rear shaft, the hub, and the spacer described below are also made of a material with an identical coefficient of thermal expansion, dimensional displacement due to thermal expansion will not occur, and an air gap δ between both electrodes will not change even with temperature variations.

If the differential rotation capacity-type angle converter is used along with the present invention, a galvanometer with excellent temperature characteristics will be provided.

Although there still is a problem of thermal expansion of the glass disc having the patterned common electrode, coefficients of thermal expansion of blue plate glass and stainless steel, for example, are $87 \times 10^{-7}$ and $100 \times 10^{-7}$, respectively, and the difference thereof is small. Considering that the glass thickness is roughly 0.55 mm, the difference may be ignored.

Moreover, a spacer is used to add precision to an extremely small air gap δ of 0.04 to 0.05 mm between both electrodes.

Recently, the machining precision of NC (numerical control) machine tools and the like has improved greatly; however, even components with improved machining precision hardly provide a precise air gap δ since the machining errors of each component accumulate as a result of assembling.

Therefore, it is highly beneficial if a distance L from an end X of the case (see FIG. 1) to a surface of the common electrode is measured for each individual product during assembly and, based on the measurement, a dimension is set by polishing both ends of the spacer.

BRIEF DESCRIPTION OF THE DRAWINGS

FIG. 2A and FIG. 2B are a schematic elevational cross section and a schematic side view, respectively, showing an assembly of a common electrode, a hub, and a lead pull-out terminal of a capacitive position detector of the galvanometer of FIG. 1;

DESCRIPTION OF THE PREFERRED EMBODIMENT

Figure 1:
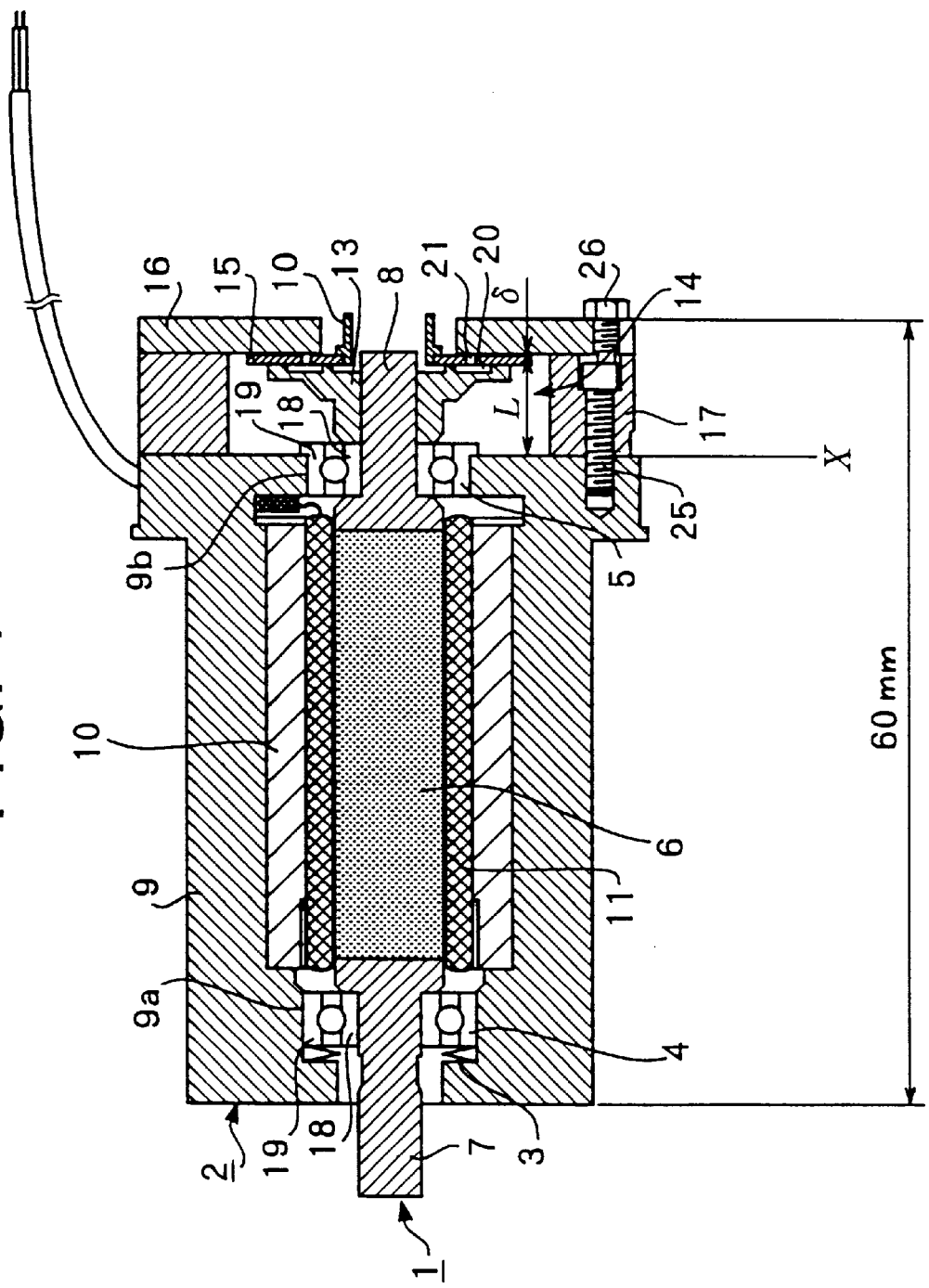
FIG. 1 is an elevational cross section of a moving magnet type galvanometer according to an embodiment of the present invention.

Embodiments will be explained by referring to the drawings.

FIG. 1 is an elevational cross section of a moving magnet type galvanometer according to an embodiment of the present invention.

A stator 2 has a coil 11 fixed inside a ferromagnetic cylindrical outer yoke 10 which is attached to a case 9.

To reduce the weight, the case 9 is made of aluminum having a small specific gravity, and a front shaft 7 and a rear shaft 8 are made of a stainless steel material to increase rigidity.

A rotor 1 has the front shaft 7 and the rear shaft 8 fixed respectively to both ends of a cylindrical permanent magnet 6. A front bearing 4 and a rear bearing 5 are fixed to the front shaft 7 and the rear shaft 8, respectively. Inner races 18 of the front bearing 4 and the rear bearing 5 are fixed by being pressed in or attached to the front shaft 7 and the rear shaft 8, respectively.

After springs 3 are inserted in a stepped section 9a, the rotor 1 to which the front bearing 4 and the rear bearing 5 are fixed is inserted inside the outer yoke 10, and an outer race 19 of the front bearing 4 is inserted in the stepped section 9a in a slidable manner and an outer race 19 of the rear bearing 5 is pressed in or attached to a stepped section 9b to be fixed.

Accordingly, the rotor 1 is held inside the outer yoke 10 in a rotatable manner. As dimensional errors are caused in the axial direction of the rotor 1 and the stator 2 by thermal expansion, they are corrected by the springs 3.

Figure 3B:
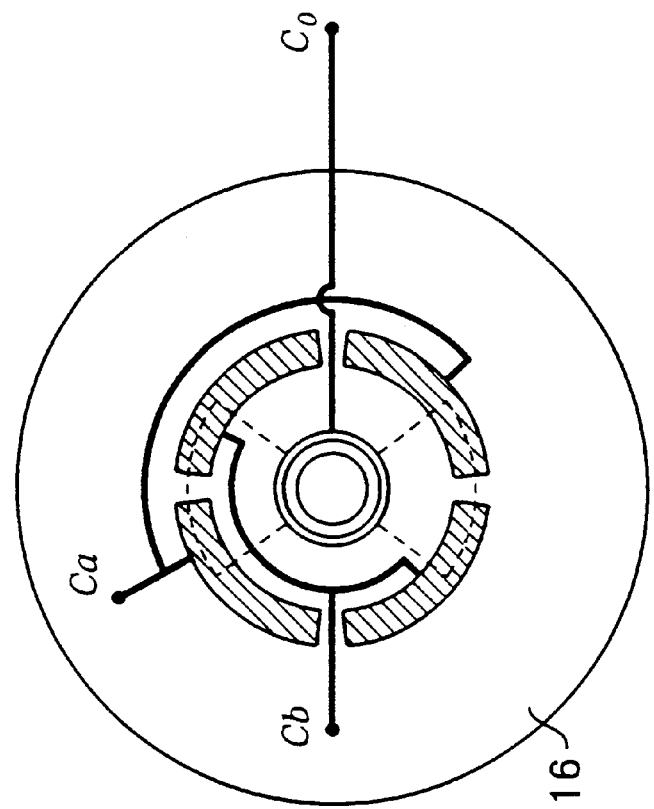
FIG. 3A and FIG. 3B are a schematic elevational cross section and a schematic side view, respectively, showing the positional relationship between a common electrode and a four-division electrode of the capacitive position detector of the galvanometer of FIG. 1.
Figure 3A:
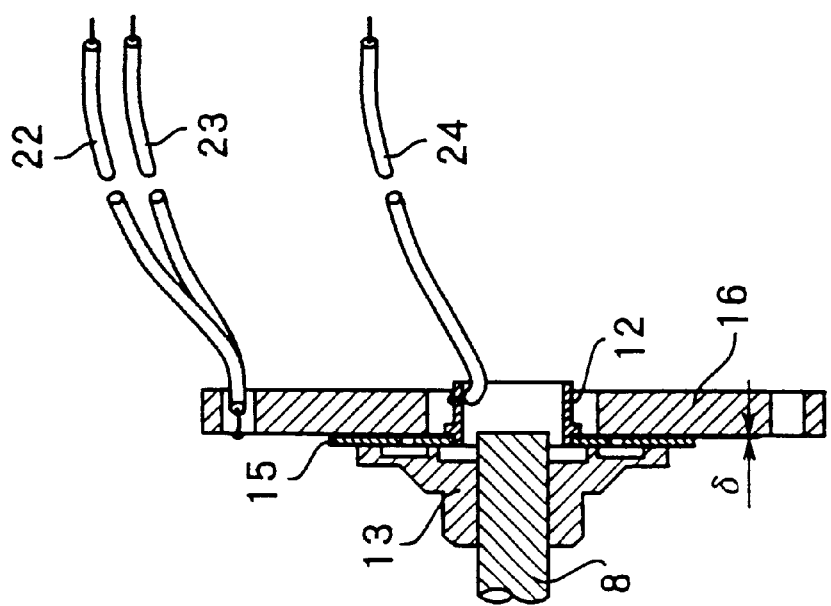
Figure 4:
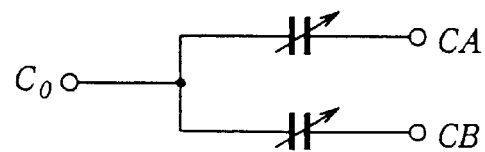
FIG. 4 is a connection diagram of the capacitive position detector of the galvanometer of FIG. 1.
Figure 5A:
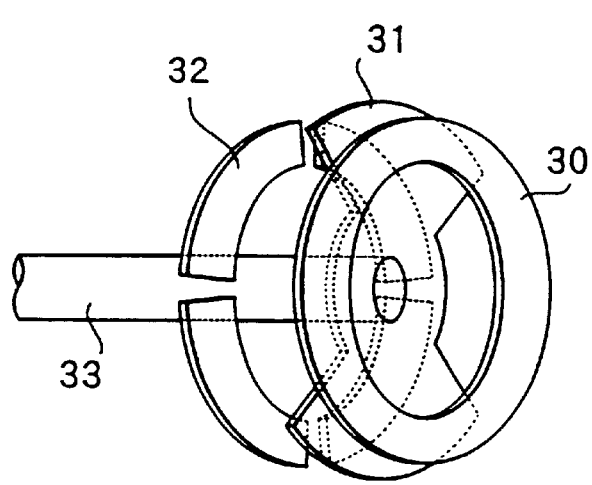
FIG. 5A and FIG. 5B are schematic diagrams showing a conventional capacitive position detector.
Figure 5B:
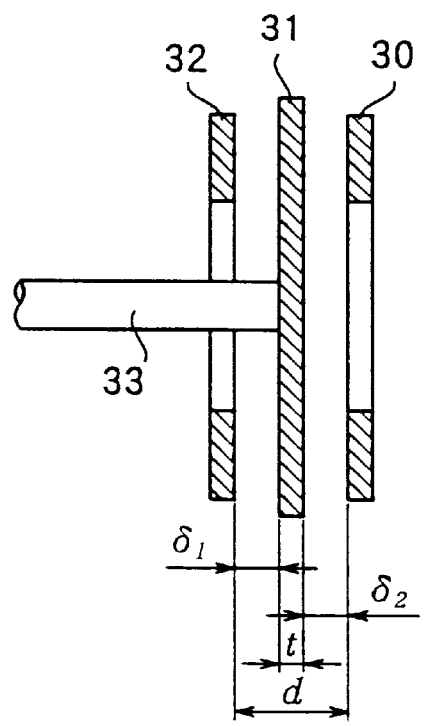

FIG. 2A and FIG. 2B are schematic diagrams showing a common electrode 15, a hub 13, and a lead pull-out terminal 12 of a capacitive position detector 14 (see FIG. 1) of the galvanometer of FIG. 1. FIG. 3A and FIG. 3B are schematic diagrams showing the positional relationship between the common electrode 15 and a four-division electrode 16 of the capacitive position detector 14 of the galvanometer of FIG. 1.

The capacitive position detector 14 is formed of the four-division electrode 16 concentrically fixed in relation to the front shaft 7 and the rear shaft 8, and the common electrode 15 fixed to the rear shaft 8 so as to concentrically oppose the four-division electrode 16 with an air gap δ therebetween.

The common electrode 15 has a butterfly-shaped pattern 15a which can cover only a pair of electrodes made up of two mutually opposing patterns of the four-division electrode 16.

When one of two pairs of capacitors Ca and Cb of the four-division electrode 16 and the common electrode 15 has increased capacitance in proportion to an angle of rotation of the common electrode 15, the capacitance of the other capacitor is reduced and the difference Ca-Cb is converted to a voltage as angle information.

The four-division electrode 16 is made by etching a printed board, and capacitor Ca lead 22 and capacitor Cb lead 23 are connected to two pairs of opposing electrodes.

The common electrode 15 is made by patterning a conductive thin film into a butterfly shape using vacuum deposition, sputtering, or the like on a surface of a glass disc having a through-hole 15b at the center thereof. The terminal 12 for connecting a lead 24 is soldered to the through-hole 15b, and the pattern 15a and the terminal 12 are electrically connected.

The common electrode 15 is attached to the hub 13, which is concentrically fixed to the rear shaft 8. The hub 13, having a flat disc portion and a hub portion, is mounted on an end of the rear shaft through a hole provided in the center of the hub portion and holds the butterfly-shaped common electrode with the flat portion perpendicular to the shaft. The disc portion has an adhesive-collection groove 20, and adhesive-injection holes 21 are formed in a glass disc section of the common electrode 15 having no conductive thin film patterning. Thus, by injecting an adhesive into those holes 21, the common electrode 15 may be properly attached, preventing misaligned surfaces.

When the temperature of the galvanometer changes due to changes in the ambient operating temperature of the galvanometer or due to heating of the galvanometer itself, and the axial dimensions of the rotor 1 and the stator 2 vary due to differences in coefficients of thermal expansion, those dimensional changes are corrected by the springs 3 where the front bearing 4 is inserted in the stepped section 9a of the case 9, so that temperature changes in the air gap δ between two electrodes of the capacitive position detector 14 due to thermal expansion may be corrected only on the detector side of the case 9 shown by X in FIG. 1.

A spacer 17 having a thickness to provide an air gap δ of a predetermined dimension is fixed to the case 9 by a bolt 25, and the four-division electrode 16 is mounted on the spacer 17 by a bolt 26.

If a component corresponding to the spacer 17 and the case 9 made of aluminum were integrally formed and the four-division electrode 16 were fixed to an end of the case 9 so as to maintain an extremely small air gap δ from the common electrode 15, the coefficients of thermal expansion would be highly different between the aluminum case 9 and the rear shaft 8 made of stainless steel, so that changes in δ due to heat would be large, causing serious errors in detecting the capacitance.

In the present invention, as described above, axial dimensional changes due to thermal expansion at a front side from the end X are corrected by springs 3; and at a rear side from the end X, errors in detecting the capacitance due to temperature changes in the air gap δ are greatly minimized by providing the spacer 17 and by using a material with an identical coefficient of thermal expansion for each component.

Moreover, the dimensions of the air gap δ have to be set with excellent precision at 0.04 to 0.05 mm. However, even if each component, the hub 13, the front shaft 7, the rear shaft 8, the case 9 and the magnet 6 are machined with improved dimensional precision, it will be extremely difficult to set the dimensions of the air gap δ, formed by the assembly of those components, at the precision mentioned above, since the machining errors of each component will accumulate.

By providing the spacer 17 as described above, the present invention solves not only the above-mentioned problem of dimensional changes in the air gap δ caused by temperature variations but also this problem.

After measuring a dimension L (see FIG. 1) between the end X and the common electrode 15 while having the spacer 17 as a separate component from the case 9, both ends of the spacer 17 may be polished to a thickness of L+(0.04 to 0.05 mm), thus setting the dimension relatively easily without significantly improving the precision of each component.

As explained above in detail, the present invention provides a moving magnet type galvanometer which has a large capacitance and which is hardly affected by humidity while making use of the conventional advantages in that the machining precision can be relatively rough and temperature variations hardly have an impact thereon.

What is claimed is:

1. A moving magnet type galvanometer comprising:
 a case;
 a stator having a ferromagnetic outer yoke held in the case and a coil fixed inside the outer yoke;
 a rotor having a cylindrical permanent magnet and a front shaft and a rear shaft supporting the permanent magnet;
 an inner race and an outer race of a rear bearing, into which the rotor inside the coil is inserted and which supports the rear shaft, said inner race and said outer race of the rear bearing being fixed to a periphery of the rear shaft and the case, respectively, and an inner race of a front bearing supporting the front shaft, said inner race of the front bearing being fixed to a periphery of the front shaft, and an outer race of the front bearing, said outer race of the front bearing being movable in an axial direction by applying force in the rear shaft direction with springs;
 a butterfly-shaped common electrode prepared by patterning a conductive thin film on a surface of a glass disc, the butterfly-shaped common electrode having a flat portion;
 a hub having a flat disc portion and a hub portion, mounted on an end of the rear shaft through a hole provided in the center of the hub portion and holding the butterfly-shaped common electrode with the flat portion perpendicular to the shaft;
 a spacer; and a four-division electrode mounted on the spacer so as to oppose the common electrode with an air gap therebetween, wherein the spacer is mounted on the case and the air gap is less than 0.1 mm wide.

2. The moving magnet type galvanometer according to claim 1, wherein the hub has a groove for adhesive collection on the surface of the disc portion and the glass disc of the common electrode has holes for adhesive injection in a section having no conductive thin film, and wherein the holes for adhesive injection are injected with adhesive so as to fix the common electrode to the hub.

3. The moving magnet type galvanometer according to claim 1, wherein the common electrode has a conductive thin film pattern formed by etching, after the conductive thin film is formed by one of depositing and sputtering on the glass disc having a through-hole at its center; and wherein the through-hole is joined by one of soldering and a conductive adhesive, with a lead pull-out terminal to be connected to the pattern.

4. The moving magnet type galvanometer according to claim 1, wherein the four-division electrode comprises a first pair of conductive segments that are electrically connected together and a second pair of conductive segments that are electrically connected together, the first pair of conductive segments and the butterfly-shaped common electrode serving as plates of a first variable capacitor in a capacitor position sensor and the second pair of conductive segments and the butterfly-shaped common electrode serving as plates in a second variable capacitor in the capacitive position sensor.

5. A moving magnet type galvanometer comprising:

a case;

a stator having a ferromagnetic outer yoke held in the case and a coil fixed inside the outer yoke;

a rotor having a cylindrical permanent magnet and a front shaft and a rear shaft supporting the permanent magnet;

an inner race and an outer race of a rear bearing, into which the rotor inside the coil is inserted and which supports the rear shaft, said inner race and said outer race of the rear bearing being fixed to a periphery of the rear shaft and the case, respectively, and an inner race of a front bearing supporting the front shaft, said inner race of the front bearing being fixed to a periphery of the front shaft, and an outer race of the front bearing, said outer race of the front bearing being movable in an axial direction by applying force in the rear shaft direction with springs;

a butterfly-shaped common electrode prepared by patterning a conductive thin film on a surface of a glass disc, the butterfly-shaped common electrode having a flat portion;

a hub having a flat portion and a hub portion, mounted on an end of the rear shaft through a hole provided in the center of the hub portion and holding the butterfly-shaped common electrode with the flat portion perpendicular to the shaft;

a spacer; and a four-division electrode mounted on the spacer so as to oppose the common electrode with an air gap therebetween, wherein the spacer is mounted on the case and the air gap is less than 0.1 mm wide, and wherein the rear shaft, the hub, and the spacer are made of an identical material.

6. The moving magnet type galvanometer according to claim 5, wherein the hub, the rear shaft, and the spacer are made of one of steel and a stainless steel material.

7. The moving magnet type galvanometer according to claim 5, wherein the four-division electrode comprises a first pair of conductive segments that are electrically connected together and a second pair of conductive segments that are electrically connected together, the first pair of conductive segments and the butterfly-shaped common electrode serving as plates of a first variable capacitor in a capacitor position sensor and the second pair o conductive segments and the butterfly-shaped common electrode serving as plates in a second variable capacitor in the capacitive position sensor.

* * * * *